(12) United States Patent
Takatani et al.

(10) Patent No.: US 7,144,444 B2
(45) Date of Patent: Dec. 5, 2006

(54) HYDROGEN SEPARATION MEMBRANE, HYDROGEN SEPARATION UNIT, AND MANUFACTURING METHOD FOR HYDROGEN SEPARATION MEMBRANE

(75) Inventors: Hideaki Takatani, Hiroshima-ken (JP); Toshiro Kobayashi, Hiroshima-ken (JP); Masaki Kawano, Hiroshima-ken (JP); Kazuto Kobayashi, Hiroshima-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/454,009

(22) Filed: Jun. 3, 2003

(65) Prior Publication Data

US 2003/0233940 A1 Dec. 25, 2003

(30) Foreign Application Priority Data

Jun. 7, 2002 (JP) .............................. 2002-167414

(51) Int. Cl.
*B01D 53/22* (2006.01)
*B01D 71/02* (2006.01)

(52) U.S. Cl. .......................... 95/56; 96/11; 55/DIG. 5

(58) Field of Classification Search ............... 95/56, 95/55; 96/4, 11; 55/DIG. 5
See application file for complete search history.

(56) References Cited

U.S. PATENT DOCUMENTS

| | | | |
|---|---|---|---|
| 366,081 A * | 7/1887 | Edgerton | .................... 423/655 |
| 3,192,136 A | 6/1965 | Reid | |
| 3,428,476 A * | 2/1969 | Langley et al. | ............. 427/229 |
| 3,469,372 A * | 9/1969 | Yamauchi et al. | ............. 96/11 |
| 3,505,180 A | 4/1970 | Brogden | |
| 3,717,525 A * | 2/1973 | Bultemann | .................... 156/77 |
| 4,528,003 A * | 7/1985 | Dittrich et al. | ................... 96/4 |
| 5,498,278 A * | 3/1996 | Edlund | ........................... 96/11 |
| 5,639,431 A | 6/1997 | Shirasaki et al. | ........... 422/212 |
| 5,782,960 A | 7/1998 | Ogawa et al. | ................... 96/11 |
| 6,152,995 A * | 11/2000 | Edlund | ........................... 96/4 |
| 6,315,820 B1 * | 11/2001 | Saloka et al. | ................... 96/11 |
| 6,419,728 B1 * | 7/2002 | Edlund | ........................... 96/4 |
| 6,541,676 B1 * | 4/2003 | Franz et al. | ................. 585/250 |
| 6,547,858 B1 * | 4/2003 | Edlund et al. | ................... 96/4 |
| 2002/0028345 A1 | 3/2002 | Kempf et al. | |
| 2002/0062738 A1 * | 5/2002 | Yoshida et al. | ................. 96/11 |

(Continued)

FOREIGN PATENT DOCUMENTS

JP 60-261989 11/1985

(Continued)

OTHER PUBLICATIONS

Canadian Office Action corresponding to Canadian Application No. 2430766, dated Aug. 5, 2005.

*Primary Examiner*—Jason M. Greene
(74) *Attorney, Agent, or Firm*—Myers Bigel Sibley & Sajovec, PA (57) ABSTRACT

There is provided a hydrogen separation membrane capable of providing high hydrogen permeability and accommodating an increase in pressure difference, a hydrogen separation unit, and a manufacturing method for a hydrogen separation membrane. The hydrogen separation unit 1 has a hydrogen separation membrane 10 and a metallic porous support sheet 20 attached to the hydrogen separation membrane 10. By forming a plurality of pits in the surface of the hydrogen separation membrane 10, a thick-wall portion 15 having a large thickness and a thin-wall portion 16 having a small thickness are provided on the hydrogen separation membrane 10. Also, as a method for forming pits i.e. thin-wall portions 16, etching process is used.

10 Claims, 11 Drawing Sheets

U.S. PATENT DOCUMENTS

2002/0078827 A1 * 6/2002 Thornton .................. 96/11
2004/0003720 A1 * 1/2004 Beisswenger et al. ......... 96/11

FOREIGN PATENT DOCUMENTS

| JP | 03-245430 | 9/1991 |
| JP | 03-291389 | 11/1991 |
| JP | 05-055862 | 3/1993 |
| JP | 05-317662 | 12/1993 |
| JP | 5-317662 | * 12/1993 |
| JP | 7-124453 | * 5/1995 |
| JP | 07-124453 | 5/1995 |
| JP | 08-060883 | 3/1996 |
| JP | 08-073201 | 3/1996 |
| JP | 8-73201 | * 3/1996 |
| WO | WO 01/64321 A1 | 9/2001 |
| WO | WO 01/77011 A1 | 10/2001 |

* cited by examiner

| a | b | c | t1 | t2 |
|---|---|---|----|----|
| 10~1000 μm | 10~50 μm | 2~50 μm | 2~20 μm | 5~100 μm |

| d | e | t1 | t2 |
|---|---|----|----|
| 10~500 μm | 2~50 μm | 2~20 μm | 5~100 μm |

| | EXAMPLE 1 | EXAMPLE 2 | EXAMPLE 3 | EXAMPLE 4 | COMPARATIVE EXAMPLE 1 |
|---|---|---|---|---|---|
| SURFACE MATERIAL | Pd AND Ag | Pd AND Ag | Pd AND Ag | Pd AND Ag | Pd AND Ag |
| CORE MATERIAL | Pd AND RARE-EARTH ELEMENT | Pd AND RARE-EARTH ELEMENT | Pd AND RARE-EARTH ELEMENT | Pd AND RARE-EARTH ELEMENT | Pd AND RARE-EARTH ELEMENT |
| THICKNESS OF HYDROGEN SEPARATION MEMBRANE | 5 μm, 10 μm | 5 μm, 10 μm | 10 μm, 20 μm | 10 μm, 20 μm | 20 μm |
| PIT SHAPE | SLIT SHAPE | CIRCULAR SHAPE | SLIT SHAPE | CIRCULAR SHAPE | NO PIT |
| HYDROGEN PERMEABILITY RATIO | 3.2 | 2.8 | 1.6 | 1.4 | 1.0 |

FIG. 11

| | METHOD FOR FORMING HYDROGEN SEPARATION MEMBRANE | SCHEMATIC SECTIONAL VIEW | HYDROGEN PERMEABILITY | LEAK RATE | WELDABILITY (GAS SEAL PROPERTY) | MECHANICAL STRENGTH |
|---|---|---|---|---|---|---|
| EXAMPLE | ROLLING → ETCHING | | ○ | ○ | ○ | ○ |
| COMPARATIVE EXAMPLE 1 | ROLLING (10~20 μm) | | × | ○ | ○ | ○ |
| COMPARATIVE EXAMPLE 2 | ROLLING (<10 μm) | | ○ | × | × | × |
| COMPARATIVE EXAMPLE 3 | DEPOSITION PLATING (<10 μm) | | ○ | × | △ | ○ |

HYDROGEN SEPARATION MEMBRANE, HYDROGEN SEPARATION UNIT, AND MANUFACTURING METHOD FOR HYDROGEN SEPARATION MEMBRANE

RELATED APPLICATION

This application claims priority from Japanese Patent Application No. 2002-167414 filed Jun. 7, 2002, the disclosure of which is incorporated by reference herein in its entirety.

FIELD OF THE INVENTION

The present invention relates to a hydrogen separation membrane used for separating hydrogen gas from a mixed gas, a hydrogen separation unit, and a manufacturing method for a hydrogen separation membrane. More particularly, it relates to a hydrogen separation membrane having both high hydrogen permeability and high mechanical strength, a hydrogen separation unit, and a manufacturing method for a hydrogen separation membrane.

BACKGROUND OF THE INVENTION

The principle of manufacturing high purity hydrogen by using a hydrogen separation membrane is that a source gas (containing hydrogen) having a higher pressure than that of high purity hydrogen to be obtained is brought into contact with a hydrogen separation membrane using hydrogen permeable metallic foil to cause only hydrogen of the source gas to permeate, by which high purity hydrogen is obtained from the opposite side of the hydrogen separation membrane.

Conventionally, as a hydrogen separation unit used for manufacturing high purity hydrogen of this kind, there has been known a unit having a hydrogen separation membrane which consists of, for example, Pd or an alloy containing Pd and a porous support to which the hydrogen separation membrane is attached (for example, Japanese Patent Provisional Publication No. 62-121616 (No. 121616/1987), No. 5-76738 (No. 76738/1993), and No. 9-255306 (No. 255306/1997)).

In the above-described hydrogen separation unit, in order to get higher performance, that is, to enhance hydrogen separating performance, (A) to increase hydrogen permeation amount by decreasing the thickness of hydrogen separation membrane and (B) to increase a pressure difference between both sides of hydrogen separation membrane, that is, a pressure difference between source gas and hydrogen gas can be thought of.

With respect to item (A), for example, Japanese Patent Provisional Publication No. 62-121616 (No. 121616/1987) describes that a Pd-containing thin film (hydrogen separation membrane) is formed by vapor deposition such as CVD and PVD. Also, a method for obtaining a Pd-containing thin film by plating has been proposed (for example, Japanese Patent Provisional Publication No. 5-123548 (No. 123548/1993)).

However, in the case where a method for obtaining a hydrogen separation membrane by vapor deposition or plating is used, pores in the porous support must be closed by the deposition of a film, which necessarily increases the membrane thickness. If it is attempted to decrease the membrane thickness, a portion of porous support in which relatively large pores are formed cannot be closed completely, which may cause pinhole-shaped defects. Also, a rolled material sometimes contains inclusions with a diameter of several microns. Therefore, if it is attempted to decrease the membrane thickness only by rolling, there is a great danger of causing defects penetrating in the thickness direction.

On the other hand, the aforementioned Japanese Patent Provisional Publication No. 5-76738 (No. 76738/1993) describes that a Pd-containing thin film having a uniform thickness of 2 to 3 μm can be obtained by rolling.

However, in the case where a method for obtaining a uniformly thin hydrogen separation membrane by rolling is used, foreign matters with a diameter of several microns that exist between a roll and foil, which is a base material of hydrogen separation membrane, cannot be removed completely. Therefore, there is a fear that biting of foreign matters occurs at the rolling time and hence defect holes are produced in the hydrogen separation membrane.

In any of the above-described methods, the thickness of the obtained Pd-containing thin film is decreased uniformly. Therefore, in order to accommodate an increase in pressure difference in the above item (B), the construction of porous support must be complex, which poses problems in that the resistance to hydrogen permeation on the porous support side increases and that the manufacturing cost also increases.

SUMMARY OF THE INVENTION

The present invention has been made to solve the above-described technical problems, and accordingly an object thereof is to provide a hydrogen separation membrane capable of providing high hydrogen permeability and accommodating the aforementioned pressure difference, a hydrogen separation unit, and a manufacturing method for a hydrogen separation membrane.

To achieve the above object, the inventor carried out studies earnestly, and resultantly obtained knowledge that by decreasing the thickness of a part of a hydrogen separation membrane, both of high hydrogen permeability and high mechanical strength could be attained, which led to the production of the present invention.

The inventor has proposed a hydrogen separation membrane for separating hydrogen in a mixed gas by causing the hydrogen to selectively permeate, characterized in that the hydrogen separation membrane includes a thick-wall portion and a thin-wall portion which is formed in a predetermined pattern between the thick-wall portions and has a thickness smaller than that of the thick-wall portion.

For the hydrogen separation membrane in accordance with the present invention, since hydrogen separation is effected mainly by the thin-wall portion, high hydrogen permeability can be obtained, and since the mechanical strength is kept mainly by the thick-wall portion, an increase in pressure difference can be accommodated.

Also, the thin-wall portion of the hydrogen separation membrane in accordance with the present invention can be formed, for example, by etching. According to such a method, the thin-wall portion can be obtained easily. Further, the thin-wall portion of the hydrogen separation membrane in accordance with the present invention can be formed of Pd or an alloy containing Pd. According to such a material, the hydrogen permeability can be improved. Still further, if an oxidation resistant layer is provided on the surface of the hydrogen separation membrane, the oxidation resistance in a contact portion with the mixed gas or hydrogen can be improved.

For the hydrogen separation membrane in which a plurality of thin-wall portions are formed, by arranging the thin-wall portions in a zigzag form, the mechanical strength of the hydrogen separation membrane can be increased. On the other hand, if the area that the thin-wall portions occupy in the hydrogen separation membrane is increased, the hydrogen permeability can be improved.

Also, the present invention provides a hydrogen separation membrane for separating hydrogen in a mixed gas by causing the hydrogen to selectively permeate, characterized in that the hydrogen separation membrane includes a hydrogen separation portion for mainly separating hydrogen and a bridge portion for mainly keeping mechanical strength, and the hydrogen separation portion and the bridge portion are formed integrally.

Further, the present invention provides a hydrogen separation unit including a hydrogen separation membrane for separating hydrogen in a mixed gas by causing the hydrogen to selectively permeate and a support which has a through hole through which the hydrogen passes and to which the hydrogen separation membrane is attached, characterized in that the hydrogen separation membrane has a base layer and a net mesh layer which is formed in a net mesh shape on the base layer and has a higher etching selection ratio than that of the base layer.

According to the hydrogen separation membrane in accordance with the present invention, hydrogen separation is effected mainly by a portion in which the net mesh layer laps over the base layer, so that high hydrogen permeability can be obtained. Also, the mechanical strength is kept mainly by a portion in which the net mesh layer does not lap over the base layer, so that an increase in pressure difference can be accommodated. Further, the material constituting the net mesh layer has a higher etching selection ratio than the material constituting the base layer, that is, the net mesh layer is easily etched, so that a net mesh shaped construction can be formed easily.

By attaching the hydrogen separation membrane to the support, a hydrogen permeation unit is formed, and can be used for a hydrogen permeation apparatus.

If a barrier layer for restraining mutual diffusion between the support and the hydrogen separation membrane is provided in a joint portion between the support and the hydrogen separation membrane, a decrease in hydrogen permeability caused by the mutual diffusion between the support and the hydrogen separation membrane can be restrained.

Also, the present invention provides a manufacturing method for a hydrogen separation membrane, characterized in that foil consisting of a metal or an alloy is prepared; a resist pattern is formed on the surface of the foil; and thereafter a portion which is not covered by the resist pattern, of the foil, is etched to a predetermined depth.

According to the manufacturing method for a hydrogen separation membrane in accordance with the present invention, the thickness of the hydrogen separation membrane is decreased by scraping off the foil, so that defect holes can be prevented from being produced as compared with a method of obtaining the hydrogen separation membrane by depositing a film (plating, CVD, PVD, etc.) and a method of obtaining the hydrogen separation membrane by rolling foil.

BRIEF DESCRIPTION OF THE DRAWINGS

FIG. 1 are views showing a hydrogen separation unit in accordance with a first embodiment, FIG. 1(a) being a front view taken from the side on which the unit is in contact with a mixed gas, which is a source gas, (supply side), and FIG. 1(b) being a sectional view thereof.

FIG. 2 are views showing a hydrogen separation membrane in accordance with the first embodiment, FIG. 2(a) being a front view taken from the permeation side, FIG. 2(b) being a sectional view taken along the line IIb—IIb of FIG. 2(a), and FIG. 2(c) being a sectional view taken along the line IIc—IIc of FIG. 2(a).

FIG. 4 are views showing metallic porous sheets constituting a metallic porous support sheet, FIG. 4(a) being a sectional view taken along the line IVa—IVa of FIG. 1(b), and FIG. 4(b) being a sectional view taken along the line IVb—IVb of FIG. 1(b).

FIG. 7 are views showing a hydrogen separation membrane in accordance with a second embodiment, FIG. 7(a) being a front view of the hydrogen separation membrane, and FIG. 7(b) being a sectional view taken along the line VIIb—VIIb of FIG. 7(a).

The reference numerals shown in these figures are defined as follows: 1,hydrogen separation unit; 10,hydrogen separation membrane; 11,core material; 12,13,surface material; 14,pit; 15,thick-wall portion; 16,thin-wall portion; 20,metallic porous support sheet; 21,22,metallic porous sheet; 30,welding material; 40,barrier layer; 100,alloy sheet; 101, alloy layer consisting of Pd and rare-earth element; 102, 103,alloy layer consisting of Pd and Ag; 110,photoresist layer.

DETAILED DESCRIPTION OF THE INVENTION

The present invention will now be described in detail with reference to embodiments shown in accompanying drawings.

First Embodiment

Figure 1A:
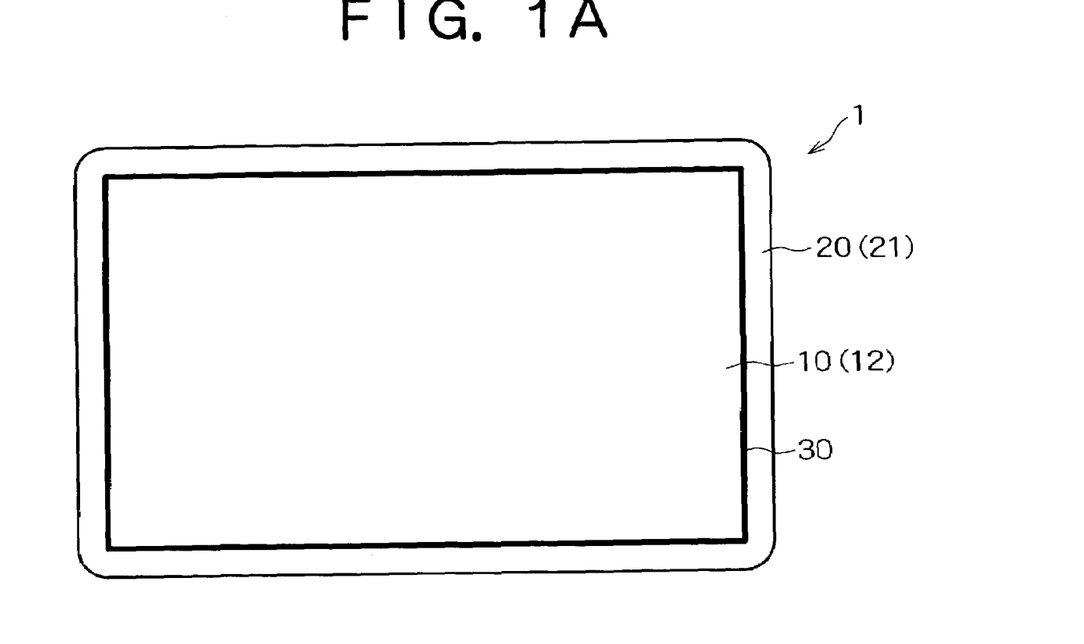
Figure 1B:
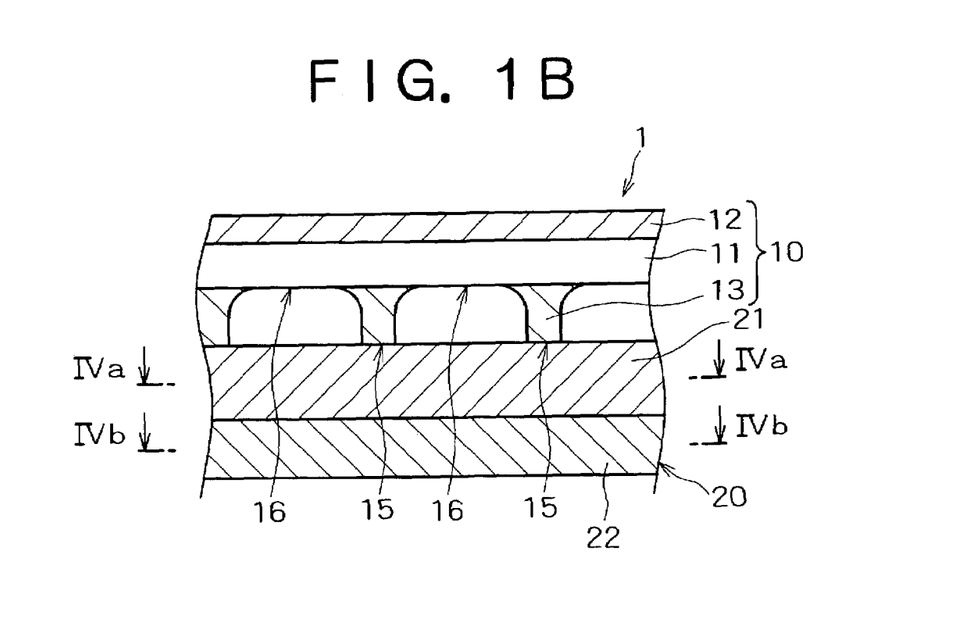

FIG. 1 is a view of a hydrogen separation unit 1 in accordance with a first embodiment to which the present invention is applied, in which FIG. 1(a) is a front view taken from the side in contact with a mixed gas used as a source gas, and FIG. 1(b) is a side view of FIG. 1(a).

In this embodiment, the hydrogen separation unit 1 has a hydrogen separation membrane 10 of a comb shape in cross section and a metallic porous support sheet 20 (support) to which the hydrogen separation membrane 10 is attached.

In this embodiment, as shown in FIGS. 1 and 2, the hydrogen separation membrane 10 includes a core material 11 consisting of an alloy of Pd and rare-earth element, a surface material 12 (oxidation resistant layer) consisting of a Pd—Ag alloy, which is provided on the side in contact with the mixed gas so as to cover the core material 11, and a surface material 13 consisting of a Pd—Ag alloy, which is formed into a bridge girder shape in cross section beneath the core material 11. The details of the hydrogen separation membrane 10 will be described later. The core material 11 is not limited to an alloy of Pd and rare-earth element, and may be a Pd—Y alloy.

On the other hand, the metallic porous support sheet 20 is made by lapping a plurality of (two in this embodiment) metallic porous sheets 21 and 22.

In FIG. 1(a), reference numeral 30 denotes a welding material for joining the outer edge of the hydrogen separation membrane 10 to the metallic porous support sheet 20 (concretely, the metallic porous sheet 21).

Figure 2A:
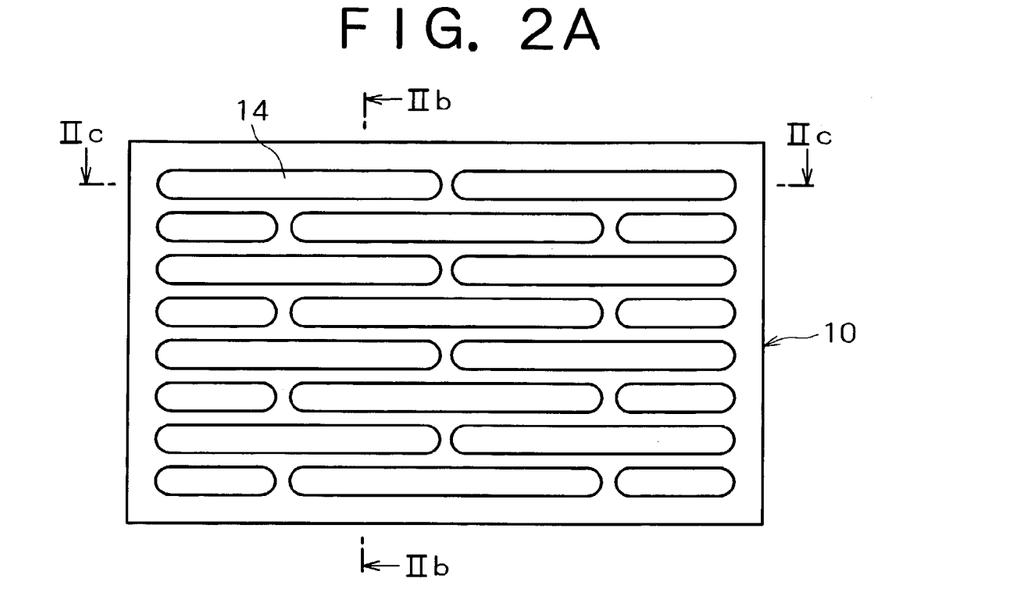
Figure 2B:
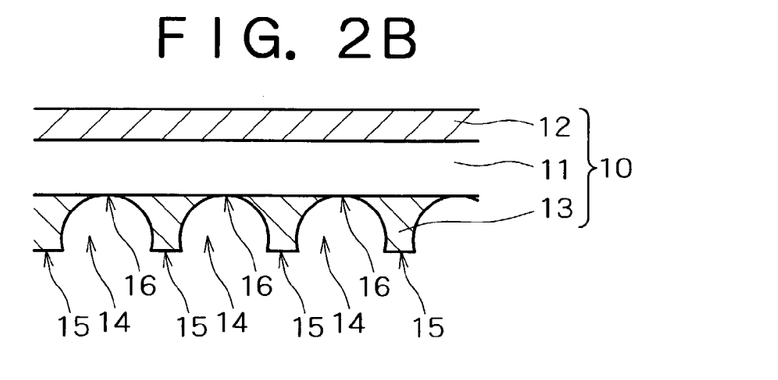
Figure 2C:
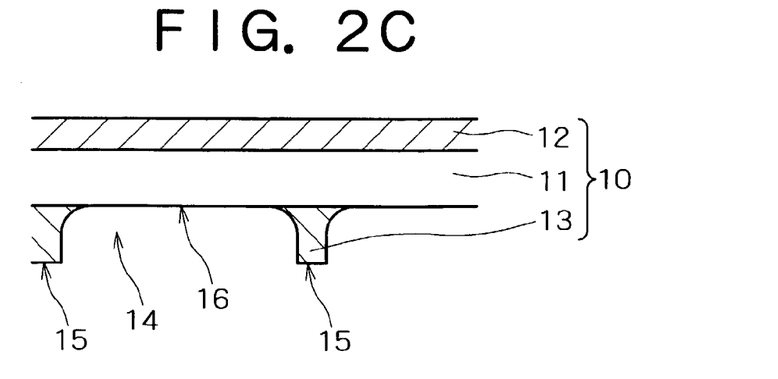

FIG. 2 shows only the hydrogen separation membrane 10 of the above-described hydrogen separation unit 1. FIG. 2(a) is a front view taken from the hydrogen gas permeation side (back side of FIG. 1(a)), FIG. 2(b) is a sectional view taken along the line IIb—IIb of FIG. 2(a), and FIG. 2(c) is a sectional view taken along the line IIc—IIc of FIG. 2(a).

In this embodiment, as shown in FIG. 2(a), on one surface of the hydrogen separation membrane 10, a plurality of slit-shaped (end portion has an arcuate shape) pits 14 are arranged. The pits 14 are arranged in parallel in a straight form in the transverse direction in the figure, and are arranged so as to be alternate in each row in the longitudinal direction in the figure. By forming the pits 14 in this manner, a thick-wall portion 15 having a large thickness (10 μm in this embodiment) and a thin-wall portion 16 having a small thickness (5 μm in this embodiment) are formed alternately.

Figure 3A:
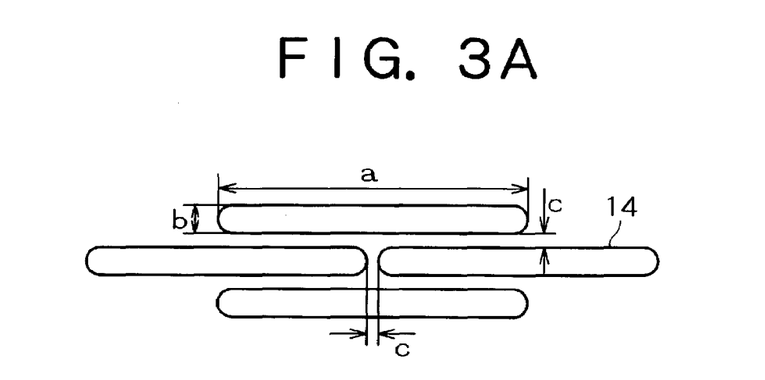
FIGS. 3(a) to 3(c) are explanatory views for illustrating the size of a pit in a first embodiment.
Figure 3B:
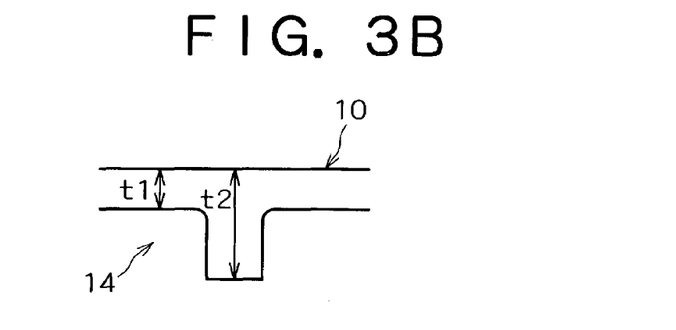
Figure 3C:
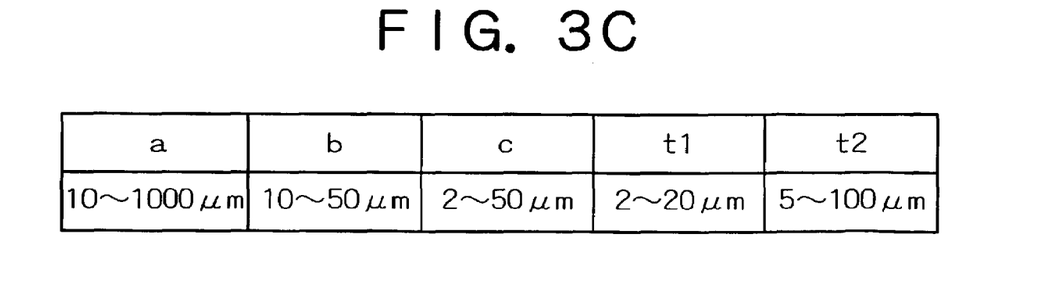

In this embodiment as shown in FIGS. 3(a) and 3(c), the length a of pit 14 is appropriately selected from the range of 10 to 1000 μm, the breadth b thereof from the range of 10 to 50 μm, and the clearance c between the adjacent pits 14 from the range of 2 to 50 μm. Also, as shown in FIGS. 3(b) and 3(c), the membrane thickness t1 of the hydrogen separation membrane 10 corresponding to a portion in which the pit 14 is formed is selected from the range of 2 to 20 μm, and the membrane thickness t2 of the hydrogen separation membrane 10 corresponding to a portion in which the pit 14 is not formed from the range of 5 to 100 μm (however, t1<t2).

If the pit 14 is made larger, the area of the thin-wall portion 16 can be increased. The increase in the area of the thin-wall portion 16 is preferable from the viewpoint of enhancing hydrogen permeability, but it accordingly decreases the area of the thick-wall portion 15, which decreases the mechanical strength of the hydrogen separation membrane 10 itself. Therefore, the size and clearance of the pit 14 and the thicknesses of the thick-wall portion 15 and the thin-wall portion 16 are selected considering the pressure difference between mixed gas and hydrogen applied to the hydrogen separation membrane 10.

Figure 4A:
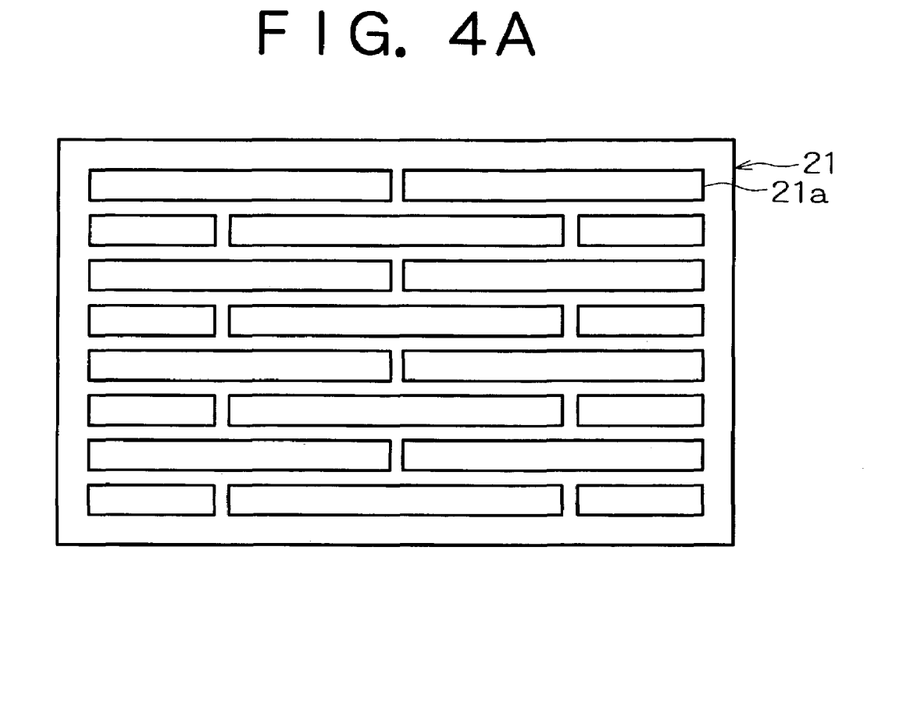
Figure 4B:
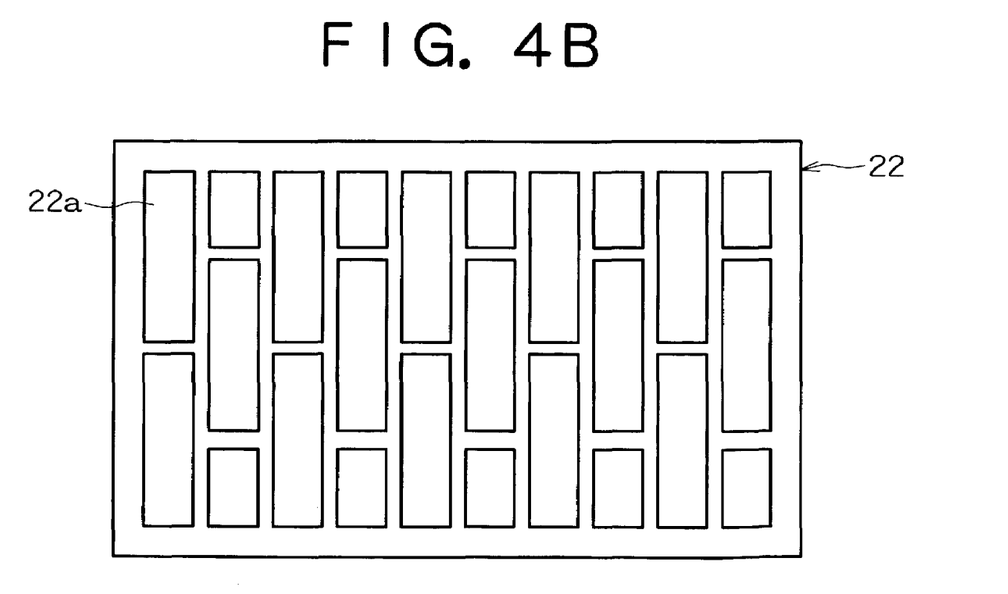

FIG. 4 shows the metallic porous sheets 21 and 22 constituting the metallic porous support sheet 20. FIG. 4(a) is a sectional view taken along the line IVa—IVa of FIG. 1(b), that is, a sectional view of the metallic porous sheet 21, and FIG. 4(b) is a sectional view taken along the line IVb—IVb of FIG. 1(b), that is, a sectional view of the metallic porous sheet 22.

In this embodiment, the metallic porous sheet 21 is formed of SUS 430 with a thickness of, for example, 0.1 mm, and has a plurality of through holes 21a of a rectangular shape in cross section. The length of the through hole 21a is 1000 μm, the breadth thereof is 180 μm, and the clearance between the adjacent through holes 21a is 20 μm. Also, the metallic porous sheet 22 is formed of SUS 430 with a thickness of, for example, 0.3 mm, and has a plurality of through holes 22a of a rectangular shape in cross section. The length of the through hole 22a is 2000 μm, the breadth thereof is 540 μm, and the clearance between the adjacent through holes 22a is 60 μm.

The through holes 21a and 22a provided in the metallic porous sheets 21 and 22, respectively, are arranged so that their lengths intersect orthogonally. Also, the through holes 21a and 22a are arranged so that the area of through holes increases away from the hydrogen separation membrane, that is, the area of the through holes 22a is larger than that of the through holes 21a, by which the hydrogen permeability can be prevented from decreasing.

Next, a manufacturing method for the hydrogen separation unit 1 in accordance with this embodiment will be described with reference to FIGS. 5(a) to 5(e).

Figure 5A:
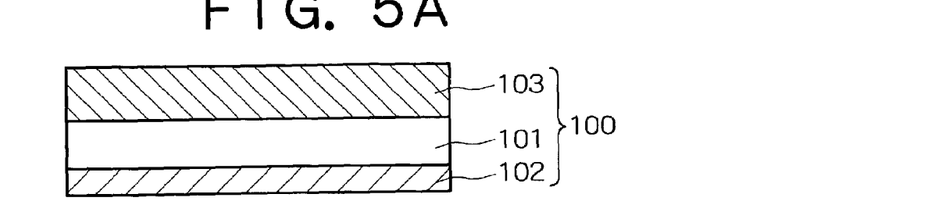
FIGS. 5(a) to 5(e) are views showing a manufacturing method for a hydrogen separation unit in accordance with a first embodiment in the order of a process sequence.

First, an alloy sheet 100 as shown in FIG. 5(a) is prepared. The alloy sheet 100 includes an alloy layer 101 consisting of Pd and rare-earth element, which serves as the core material 11, and alloy layers 102 and 103 each consisting of Pd and Ag, which serve as the surface materials 12 and 13, provided on both surfaces of the alloy layer 101 consisting of Pd and rare-earth element. The alloy sheet 100 has a thickness of 10 μm, the alloy layer 101 consisting of Pd and a rare-earth element 4 μm, the alloy layer 102 consisting of Pd and Ag 1 μm, and the alloy layer 103 consisting of Pd and Ag 5 μm.

As the method for forming the alloy sheet 100, in the case of multilayer, a method can appropriately be selected such as a method in which a Pd—Ag alloy sheet is clad on both surfaces of an alloy sheet consisting of Pd and rare-earth element and a method in which a Pd—Ag alloy film is caused to adhere onto both surfaces of an alloy sheet consisting of Pd and rare-earth element by means of CVD, PVD, or plating.

Figure 5B:
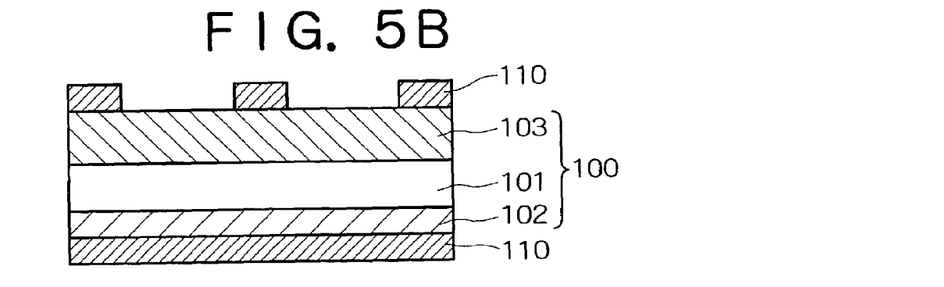

Next, as shown in FIG. 5(b), as an example of etching method, an ultraviolet curing resist is applied onto both surfaces of the alloy sheet 100 to form photoresist layers 110, and after drying, one photoresist layer 110 is exposed via a photomask, not shown, to print a pattern corresponding to the pits 14. Thereafter, the photoresist layer 110 in the exposed portion is removed by immersion into a predetermined chemical, by which a desired resist pattern is obtained.

By immersing the alloy sheet 100 on which the resist pattern has been formed into an etching liquid, wet etching is performed.

Figure 5C:
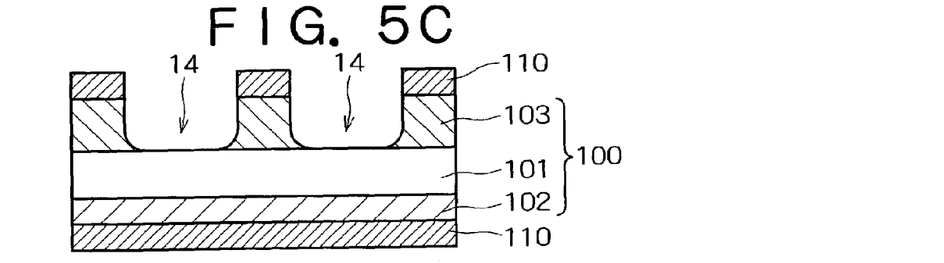

Thus, as shown in FIG. 5(c), portions that are not covered by the photoresist layer 110, of the Pd—Ag alloy layer 103, are removed, so that the pits 14 of the same pattern as the resist pattern are formed in the Pd—Ag alloy layer 103. The other Pd—Ag alloy layer 102 remains unchanged because its whole surface is covered by the photresist layer 110. The etching liquid has high capability for dissolving alloy of Pd and Ag, but has low capability for dissolving alloy of Pd and rare-earth element. Therefore, since the etching selection ratio of the alloy layer 103 consisting of Pd and Ag is higher than the alloy layer 101 consisting of Pd and rare-earth element, the alloy layer 101 consisting of Pd and rare-earth element serves as an etch stop layer, which prevents through holes or defect holes from being produced.

Figure 5D:
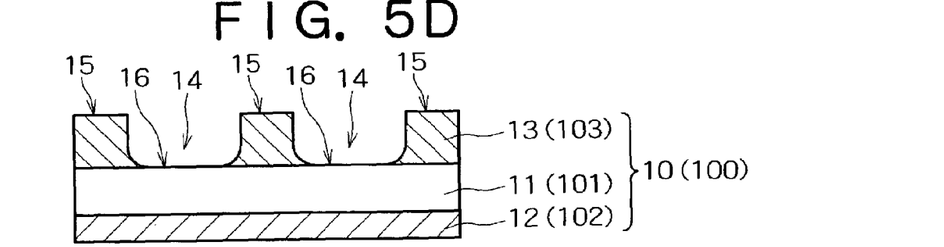

Subsequently, the photoresist layer 110 is removed by the immersion into a predetermined chemical, by which the hydrogen separation membrane 10 shown in FIG. 5(d) is obtained. At this time, the thickness of the thin-wall portion 16 formed by etching is 5 µm, and the thickness of the remaining thick-wall portion 15 is 10 µm.

Figure 5E:
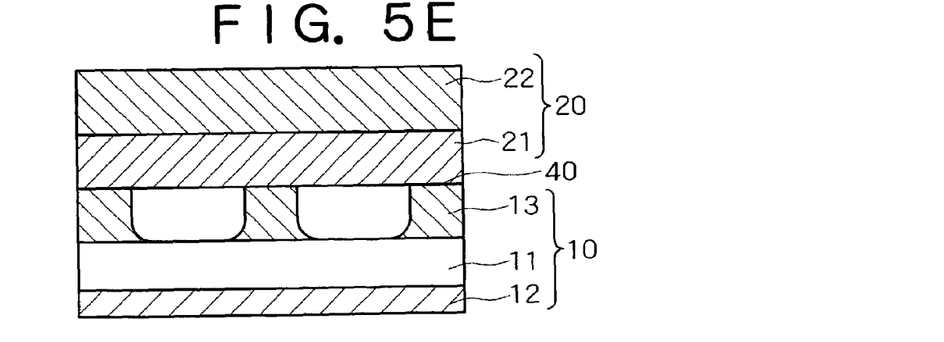

Then, the outer edge of the obtained hydrogen separation membrane 10 is joined to the metallic porous sheet 21 of the metallic porous support 20 by welding (not shown), by which the hydrogen separation unit 1 shown in FIG. 5(e) is obtained. If a barrier layer 40 is provided in advance at this time in a portion in which the hydrogen separation membrane 10 is in contact with the metallic porous sheet 21, mutual diffusion of metallic elements between the hydrogen separation membrane 10 and the metallic porous sheet 21 is restrained when the hydrogen separation unit 1 is used at a high temperature (for example, 500° C.), so that a decrease in hydrogen permeability can be prevented.

Next, the operation of the hydrogen separation unit 1 in accordance with this embodiment will be described.

In FIG. 1, a mixed gas containing hydrogen is supplied to the hydrogen separation unit 1. Herein, the temperature of the supplied mixed gas is, for example, 500° C., and the total pressure thereof is 1 MPa. When hydrogen contained in the mixed gas comes into contact with the hydrogen separation membrane 10, hydrogen molecules are dissociated into hydrogen atoms by catalytic action of Pd. The dissociated hydrogen atoms permeate the hydrogen separation membrane 10, going to the back side of the membrane, and combine again into hydrogen molecules. The pressure on the permeation side is 0.1 MPa.

Figure 6A:
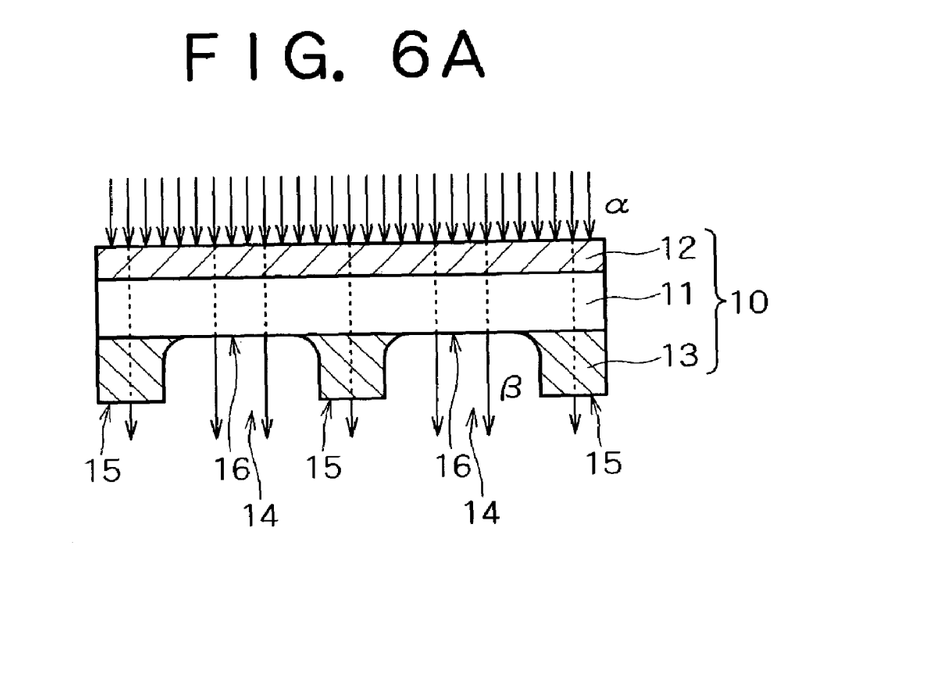
FIG. 6(a) is a schematic view for illustrating a hydrogen separation process conducted through the hydrogen separation membrane.

FIG. 6(a) schematically shows a hydrogen separation process conducted through the hydrogen separation membrane 10. In this figure, arrow mark á indicates a mixed gas, and arrow mark â indicates hydrogen.

Figure 6B:
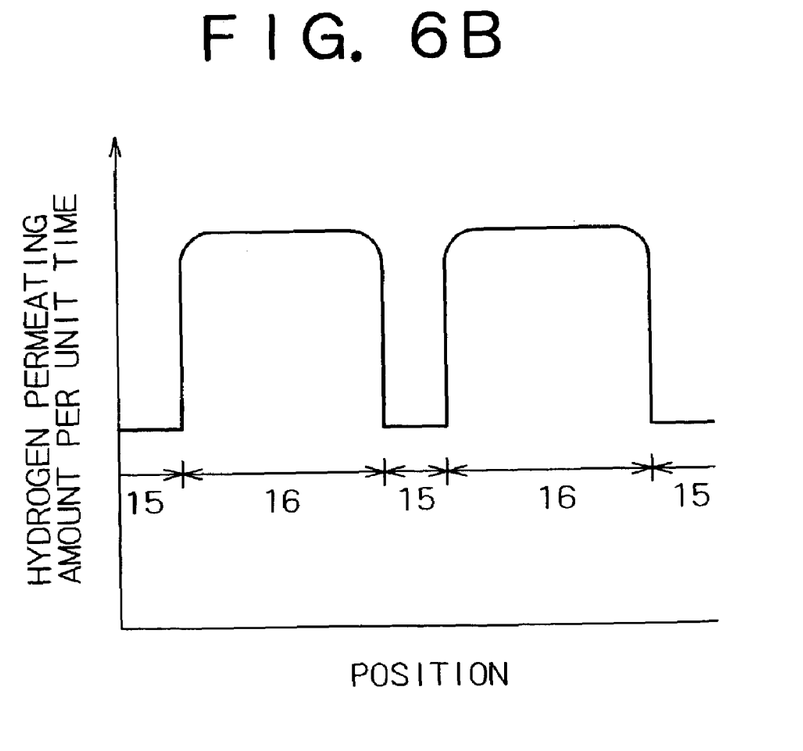
FIG. 6(b) is a graph for illustrating the amount of hydrogen permeating a thick-wall portion and a thin-wall portion.

The hydrogen separation membrane 10 has a large number of pits 14 or thin-wall portions 16, and hydrogen â mainly permeates the thin-wall portions 16. Since the thickness of the thin-wall portion 16 is as small as 5 µm, high hydrogen permeability can be obtained. Specifically, the hydrogen permeating amount per unit time is proportional to the inverse number of the thickness of the hydrogen separation membrane 10, so that as shown in FIG. 6(b), the amount of hydrogen permeating the thin-wall portion 16 is larger than that permeating the thick-wall portion 15.

Also, since the thick-wall portion 15 with a thickness of 10 µm is formed like a net so as to surround the pits 14 or the thin-wall portions 16, the thick-wall portion 15 serves as a bridge, so that mechanical strength for withstanding the pressure of mixed gas á is also achieved. Further, in the case where the surface materials 12 and 13 are provided on the surfaces of the hydrogen separation membrane 10, deterioration due to oxidation can be prevented as compared with the case where the hydrogen separation membrane 10 is formed of only an alloy of Pd and rare-earth element.

Also, in this embodiment, since the hydrogen separation membrane 10 is attached to the metallic porous support 20 as shown in FIG. 1, the mechanical strength is further increased.

Although the description of the plate-shaped hydrogen separation unit 1 has been made, the shape of the hydrogen separation unit 1 is not limited to this one, and may be cylindrical as described in, for example, Japanese Patent Provisional Publication No. 9-225306 (No. 255306/1997).

Also, although the pits 14 are provided in one surface of the hydrogen separation membrane 10 to form the thin-wall portions 16 in this embodiment, the configuration is not limited to this. The thin-wall portions 16 may be formed by providing the pits 14 in both surfaces of the hydrogen separation membrane 10.

Further, although an alloy containing Pd is used as the hydrogen separation membrane 10 in this embodiment, the configuration is not limited to this. An alloy having hydrogen permeability, such as Nb base alloys described in Japanese Patent Provisional Publication No. 2000-159503, which was filed by the applicant, and $Zi_{36}Ni_{64}$ amorphous alloy, can be selected appropriately.

Still further, although a membrane having a multilayer construction is used as the hydrogen separation membrane in this embodiment, the configuration is not limited to this. For example, a membrane in which the above-described thin-wall portions 16 are formed on a single-layer alloy membrane consisting of Pd and rare-earth element can also be used.

Also, in this embodiment, the hydrogen separation unit 1 is formed by attaching the hydrogen separation membrane 10 to the metallic porous support sheet 20. The shapes of the through holes 21a and 22a formed in the metallic porous support sheet 20 (concretely, the metallic porous sheets 21 and 22) are not limited to rectangular. The shapes can be appropriately changed in designing to, for example, circular or polygonal.

Moreover, not only the metallic porous support sheet 20 but also a porous member such as a porous sintered compact or porous glass can be used as the support for the hydrogen separation membrane 10.

Further, in this embodiment, hydrogen separation is effected by using the hydrogen separation unit 1 in which the hydrogen separation membrane 10 is attached to the metallic porous support sheet 20. However, the hydrogen separation membrane can be used singly. In this case as well, high hydrogen permeability can be obtained by the thin-wall portion 16, and a sufficient mechanical strength can be secured by the thick-wall portion 15.

Also, although the pits 14 or the thin-wall portions 16 are formed by immersing the alloy sheet 100, on which a resist pattern is formed, in the etching liquid in this embodiment, the etching method is not limited to this. For example, a jet flow of etching liquid may be injected perpendicularly onto the surface of the alloy sheet 100 on which a resist pattern is formed to form the pits 14. Furthermore, the above-described method is one belonging to what we call wet etching. However, the method may be what we call dry etching.

Further, although etching is performed after the resist pattern is formed in this embodiment, the method is not limited to this. The pits 14 may be formed directly, for example, by irradiating an ion beam corresponding to the pattern of the pits 14 in a vacuum to scraping off the alloy layer.

The method for forming the pits 14 is not limited to the above-described scraping-off method. For example, a rolling method using a roll having minute protrusions may be used.

Second Embodiment

Figure 7A:
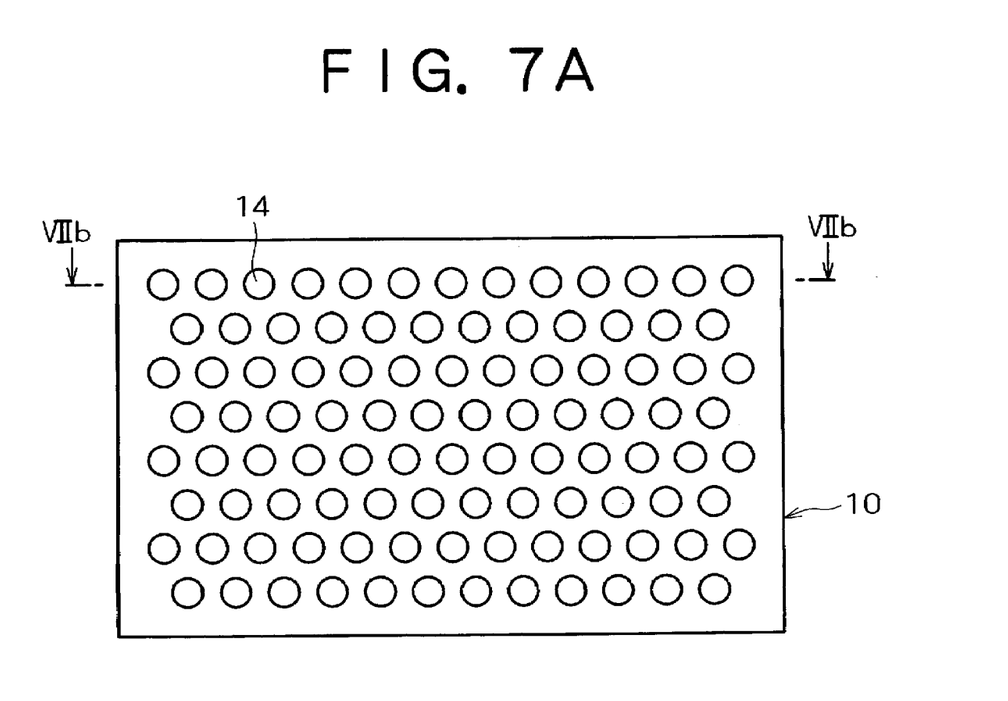
Figure 7B:
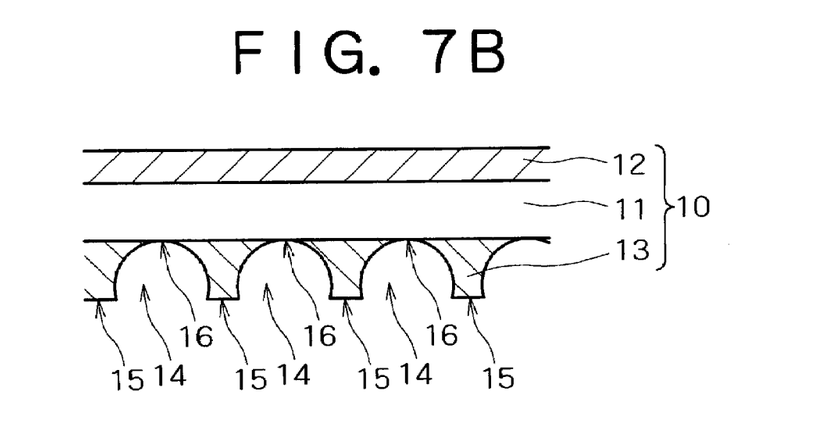

FIG. 7 shows the hydrogen separation membrane 10 of the hydrogen separation unit 1 in accordance with a second embodiment to which the present invention is applied. FIG. 7(a) is a front view of the hydrogen separation membrane 10, and FIG. 7(b) is a sectional view taken along the line VIIb—VIIb of FIG. 7(a). The hydrogen separation membrane 10 of this embodiment is almost the same as that described in the first embodiment except that the shape of the pit 14 is circular and the pits 14 are arranged in a zigzag form.

Figure 8A:
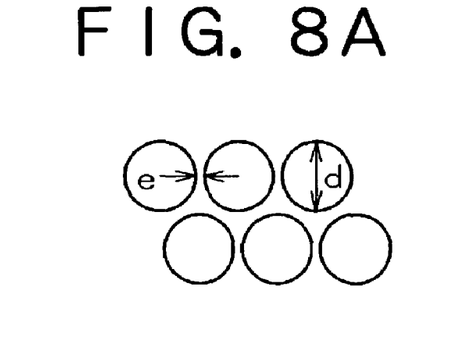
FIGS. 8(a) to 8(c) are explanatory views for illustrating the size of a pit in a second embodiment.
Figure 8B:
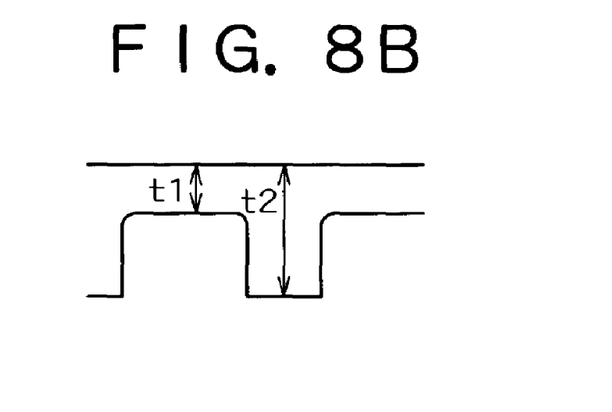
Figure 8C:
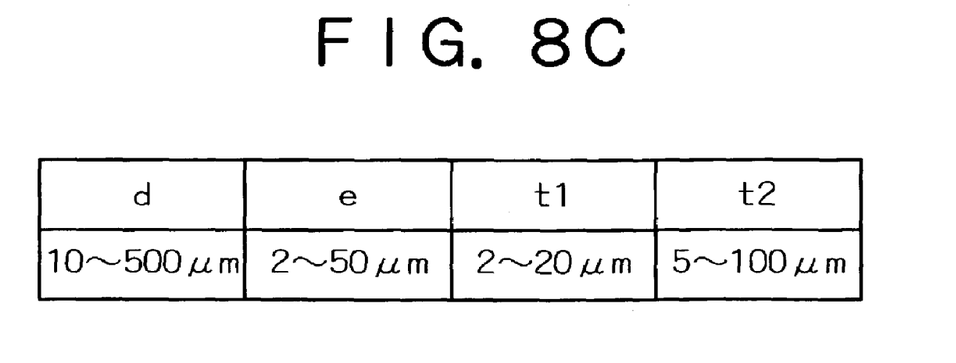

In this embodiment, as shown in FIGS. 8(*a*) and 8(*c*), the diameter d of the pit 14 is appropriately selected from the range of 10 to 500 m, and the clearance e between the adjacent pits 14 from the range of 2 to 50 μm. Also, as shown in FIGS. 8(*b*) and 8(*c*), the thickness t1 of the hydrogen separation membrane 10 corresponding to a portion in which the pit 14 is formed is appropriately selected from the range of 2 to 20 μm, and the thickness t2 of the hydrogen separation membrane 10 corresponding to a portion in which the pit 14 is not formed from the range of 5 to 100 μm (however, t1<t2).

In this embodiment, the hydrogen separation membrane 10 is formed by arranging the circular pits 14 in a zigzag form, so that a stronger bridge is formed by the thick-wall portion 15, and the mechanical properties of the hydrogen separation membrane 10 can be improved as compared with the hydrogen separation membrane 10 of the first embodiment.

Figure 9A:
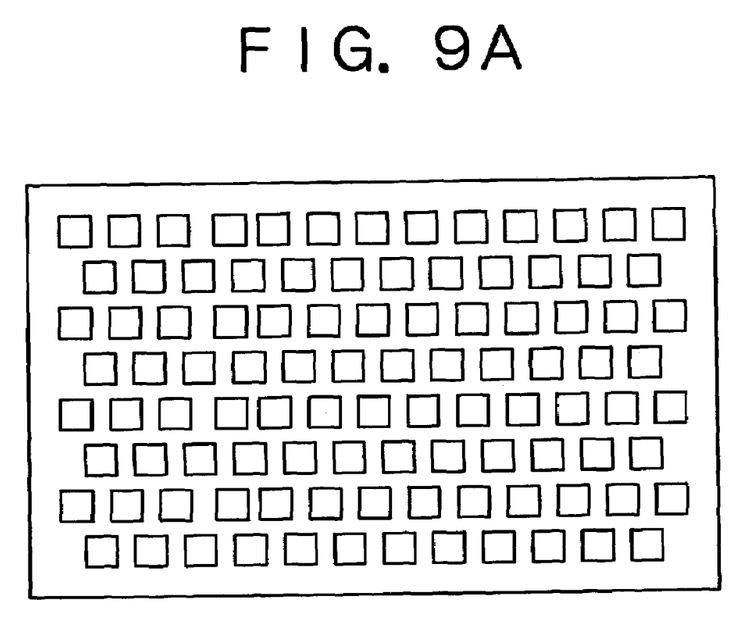
FIGS. 9(a) and 9(b) are schematic views for illustrating another method for arranging pits.

Although the hydrogen separation membrane 10 is formed by arranging the circular pits 14 in a zigzag form in this embodiment, the configuration is not limited to this. For example, as shown in FIG. 9(*a*), square pits 14 may be arranged in a zigzag form. This case corresponds to the case where the length a of the pit 14 is equal to the breadth b thereof in the first embodiment.

Figure 9B:
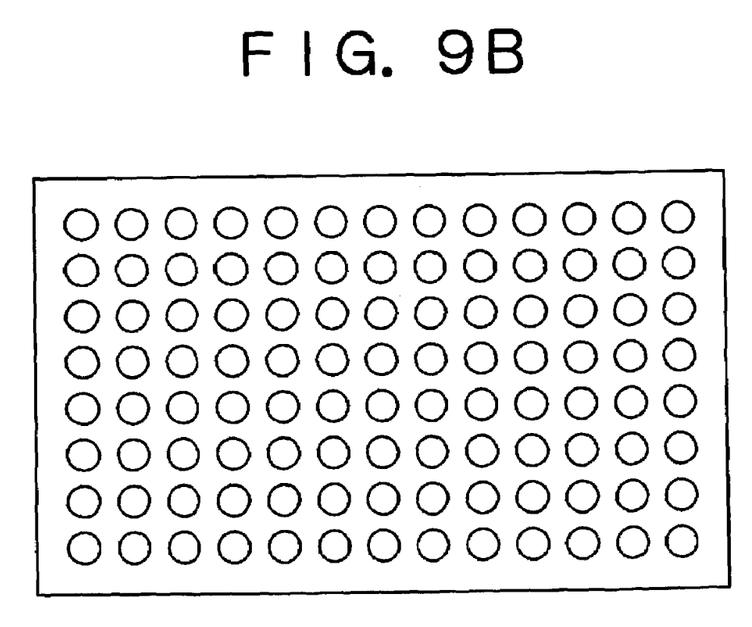

Also, for example, as shown in FIG. 9(*b*), the hydrogen separation membrane 10 may be formed by arranging the circular pits 14 in a lattice form.

Figure 10:
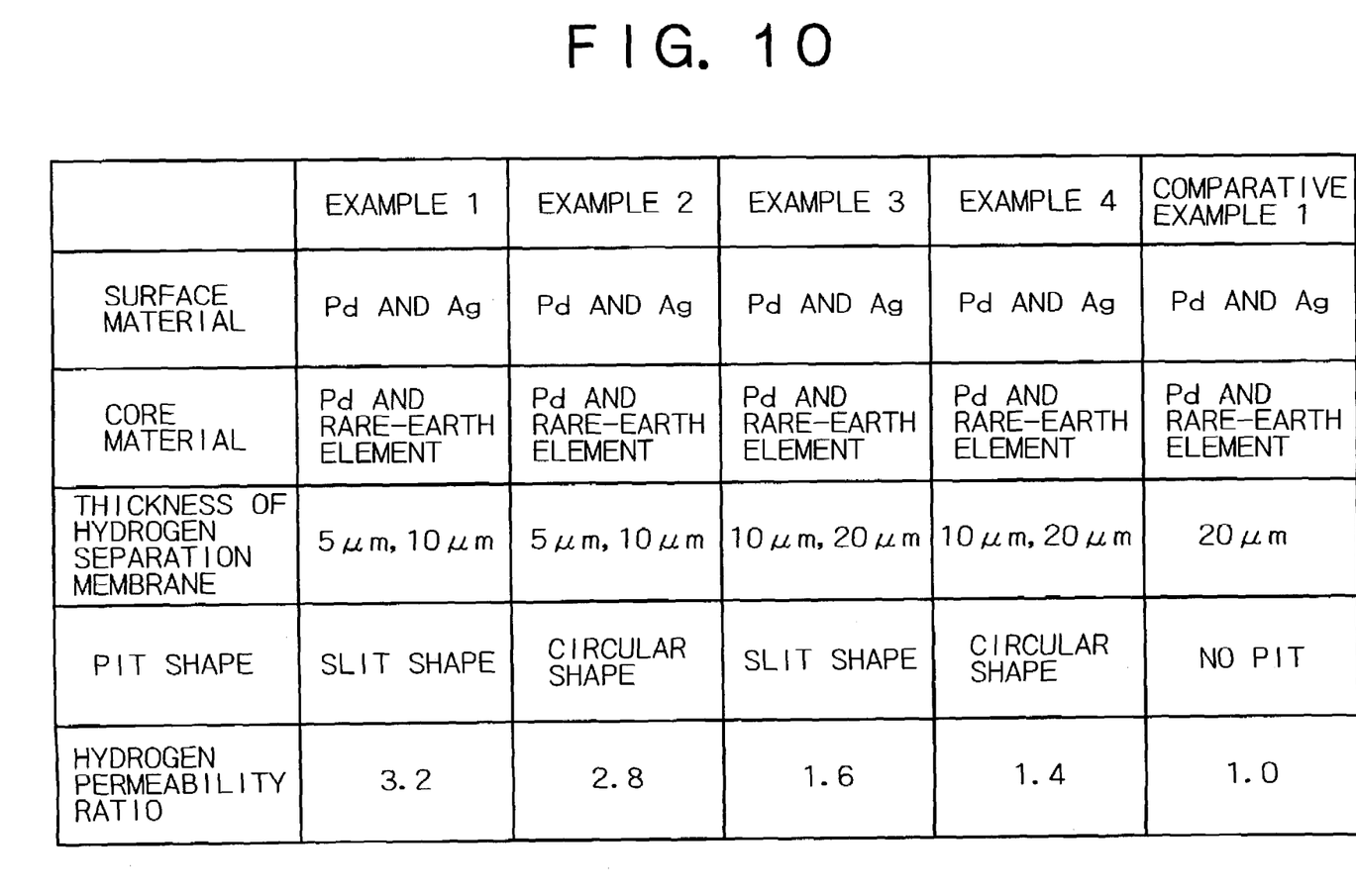
FIG. 10 is a table comparing hydrogen permeability of a hydrogen separation membrane used in a first embodiment and a second embodiment with that of a conventional hydrogen separation membrane.

FIG. 10 shows the comparison result of hydrogen permeability of the hydrogen separation membrane 10 used in the first embodiment (examples 1 and 3), the hydrogen separation membrane 10 used in the second embodiment (examples 2 and 4), and the conventional hydrogen separation membrane 10 having no pits 14 or thin-wall portions 16 (comparative example 1). In this comparison, all of the core material 11 and surface materials 12 and 13 have the same properties. The hydrogen permeability ratio is indicated by a ratio obtained by taking the hydrogen permeability of comparative example 1 as 1.

From this result, it can be understood that in examples 1 and 2, the hydrogen permeability is enhanced by providing the thin-wall portions 16 as compared with comparative example 1.

Also, in examples 1 to 4, the hydrogen permeability of example 1 is highest. The reason for this is thought to be that in addition to smaller thickness of the hydrogen separation membrane 10, the slit-shaped pits 14 provide a larger area of the thin-wall portions 16.

Figure 11:
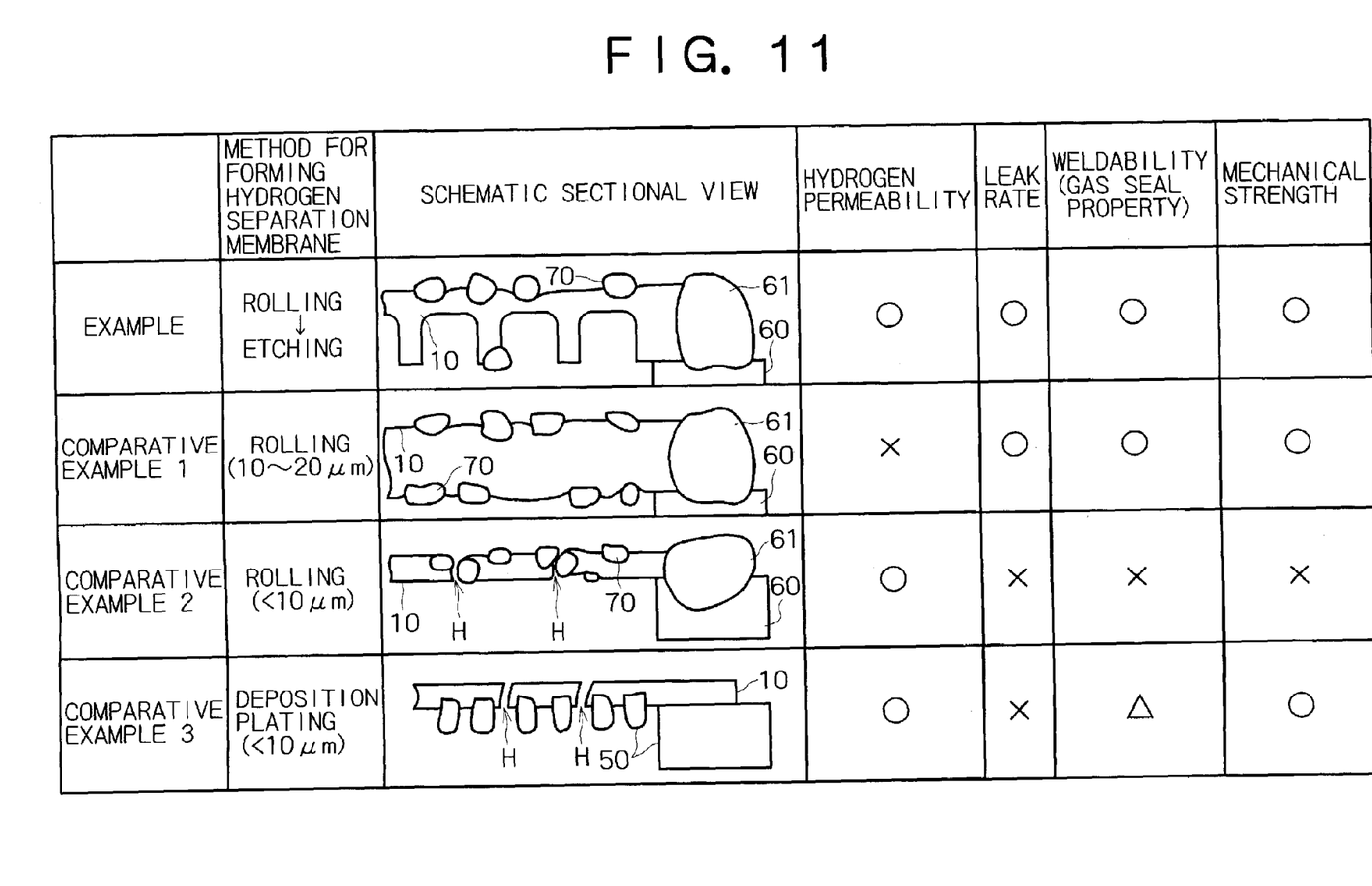
FIG. 11 is a table comparing hydrogen permeability, leak rate, weldability, and mechanical strength of a hydrogen separation membrane used in a first embodiment and a second embodiment with those of a conventional hydrogen separation membrane.

FIG. 11 relatively compares the hydrogen permeability, gas leak rate, weldability, and mechanical strength of the hydrogen separation membrane 10 obtained by various methods.

In FIG. 11, example shows the single hydrogen separation membrane 10 used in the second embodiment, comparative example 1 shows the hydrogen separation membrane 10 having a thickness in the range of 10 to 20 μm obtained by rolling, comparative example 2 shows the hydrogen separation membrane 10 having a thickness smaller than 10 μm obtained by rolling, and comparative example 3 shows the hydrogen separation membrane 10 having a thickness smaller than 10 μm obtained by deposition or plating on a porous sintered compact 50.

In this figure, reference numeral 60 denotes a frame to which the outer edge of the hydrogen separation membrane 10 is attached, and reference numeral 61 denotes a welded portion for joining the hydrogen separation membrane 10 to the frame 60. In comparative example 3, the hydrogen separation membrane 10 is attached to the porous sintered compact 50 by deposition or plating, so that welding is unnecessary.

Reference numeral 70 denotes foreign matters (having a diameter of about several microns) biting into the hydrogen separation membrane 10 when the hydrogen separation membrane 10 is formed by rolling (comparative examples 1 and 2) or when the base material of the hydrogen separation membrane 10 is formed by rolling (comparative example 3).

Referring to FIG. 11, for example, in comparative example 1, since the thickness of the hydrogen separation membrane 10 is large, even if the foreign matters 70 bite into the hydrogen separation membrane 10, there in no fear of occurrence of leak, and the weldability is high. However, comparative example 1 has a problem in that the hydrogen permeability, which is a vital factor of the hydrogen separation membrane 10, is decreased.

Also, in comparative example 2, since the thickness of the hydrogen separation membrane 10 is small, the hydrogen permeability is high. However, a through hole H is easily produced by the biting of the foreign matters 70, and the leak rate is low. In addition, the weldability and mechanical properties are deteriorated.

Further, in comparative example 3, since the thickness of the hydrogen separation membrane 10 is small, the hydrogen permeability is high, and also in the case of the support of the dense porous sintered compact 50, the mechanical properties are also high. However, relatively large pores in the porous sintered compact 50 cannot be closed completely, the through hole H is easily produced, and the leak rate is lowered. Also, it is difficult to secure the gas seal property at the plating end.

Contrarily, it is understood that example provides excellent performance in terms of all of the four evaluation items. In example, although evaluation of the single hydrogen separation membrane 10 has been carried out, it is needless to say that the mechanical strength is increased further in the case of the hydrogen separation unit 1 in which the hydrogen separation membrane 10 is attached to the metallic porous support sheet 20.

As described above, according to the present invention, by using the hydrogen separation membrane having the thick-wall portion and the thin-wall portion, hydrogen is mainly caused to permeate the thin-wall portion, and the mechanical strength is kept mainly by the thick-wall portion. Thereby, high hydrogen permeability can be achieved, and also an increase in pressure difference can be accommodated.

What is claimed is:

1. A hydrogen separation membrane comprising a hydrogen permeable portion of said membrane for separating hydrogen in a mixed gas by causing said hydrogen to selectively permeate, wherein said hydrogen permeable portion comprises:
   a) a first alloy layer comprising Pd and a rare earth element;
   b) a second alloy layer comprising Pd and Ag; and
   c) a third alloy layer comprising Pd and Ag,
wherein b) and c) are disposed on opposite surfaces of a) and the etching selection ratio of the allow layer c) is greater than that of the alloy layer a), and characterized in that:
   said hydrogen permeable portion further comprises a plurality of pits arranged in the allow layer c) such that said hydrogen permeable portion comprises a thick-wall portion of alloy layers a), b) and c) and a thin-wall portion of alloy layers a) and b), which is formed in a predetermined pattern between said thick-wall portions and has a thickness less than that of said thick-wall portion.

2. The hydrogen separation membrane according to claim 1, characterized in that said thin-wall portion is formed by etching.

3. The hydrogen separation membrane according to claim 1, characterized in tat said hydrogen separation membrane consists of Pd or an alloy containing Pd.

4. The hydrogen separation membrane according to claim 1, characterized in that an oxidation resistant layer is provided on a surface of said hydrogen separation membrane.

5. The hydrogen separation membrane according to claim 1, characterized in that a plurality of said thin-wall portions are formed, and said thin-wall portions are arranged in a zigzag form.

6. The hydrogen separation membrane according to claim 1, characterized in that:
   said hydrogen separation membrane further comprises a bridge portion primarily for keeping mechanical strength; and the hydrogen permeable portion of said hydrogen separation membrane and said bridge portion are formed integrally.

7. A hydrogen separation unit comprising the hydrogen separation membrane of claim 1 for separating hydrogen in a mixed gas by causing said hydrogen to selectively permeate and a support which has a through hole through which said hydrogen passes and to which said hydrogen separation membrane is attached, characterized in that:
   said hydrogen separation membrane further comprises a base layer and a net mesh layer which is formed in a net mesh shape on said base layer and has a higher etching selection ratio than that of said base layer.

8. The hydrogen separation unit according to claim 7, characterized in that a barrier layer for restraining mutual diffusion between said support and said hydrogen separation membrane is provided in a joint portion between said support and said hydrogen separation membrane.

9. The hydrogen separation unit according to claim 7, characterized in that a barrier layer for restraining mutual diffusion between said support and said hydrogen separation membrane is provided in a joint portion between said support and said hydrogen separation membrane.

10. A manufacturing method for the hydrogen separation membrane of claim 1, which comprises:
   preparing a foil consisting of a metal or an alloy; forming a resist pattern on a surface of said foil; and thereafter etching a portion of said foil which is not covered by said resist pattern to a predetermined depth to form the thin-wall portion between the thick-wall portions of the hydrogen permeable portion of said hydrogen separation membrane.

* * * * *